Figure 1:
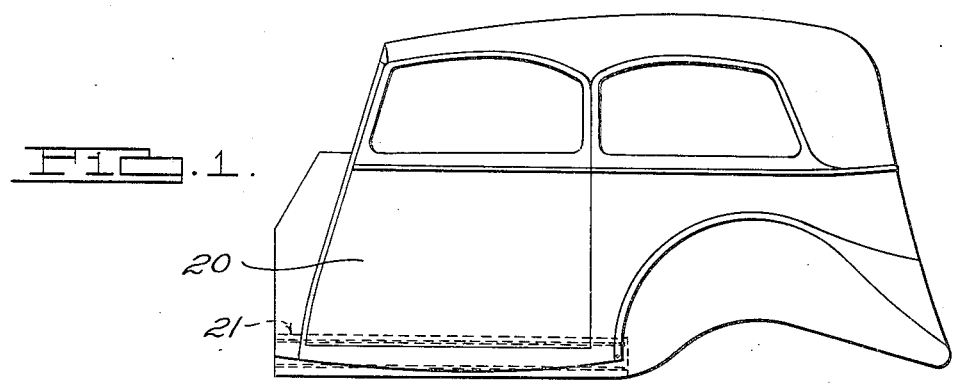

Feb. 23, 1937.  C. H. WIDMAN ET AL  2,072,044
VEHICLE BODY CONSTRUCTION
Filed July 10, 1933   2 Sheets-Sheet 1

INVENTORS
Amos E. Northup,
Charles H. Widman.
BY
Harness, Dickey, Pierce & Hann.
ATTORNEYS

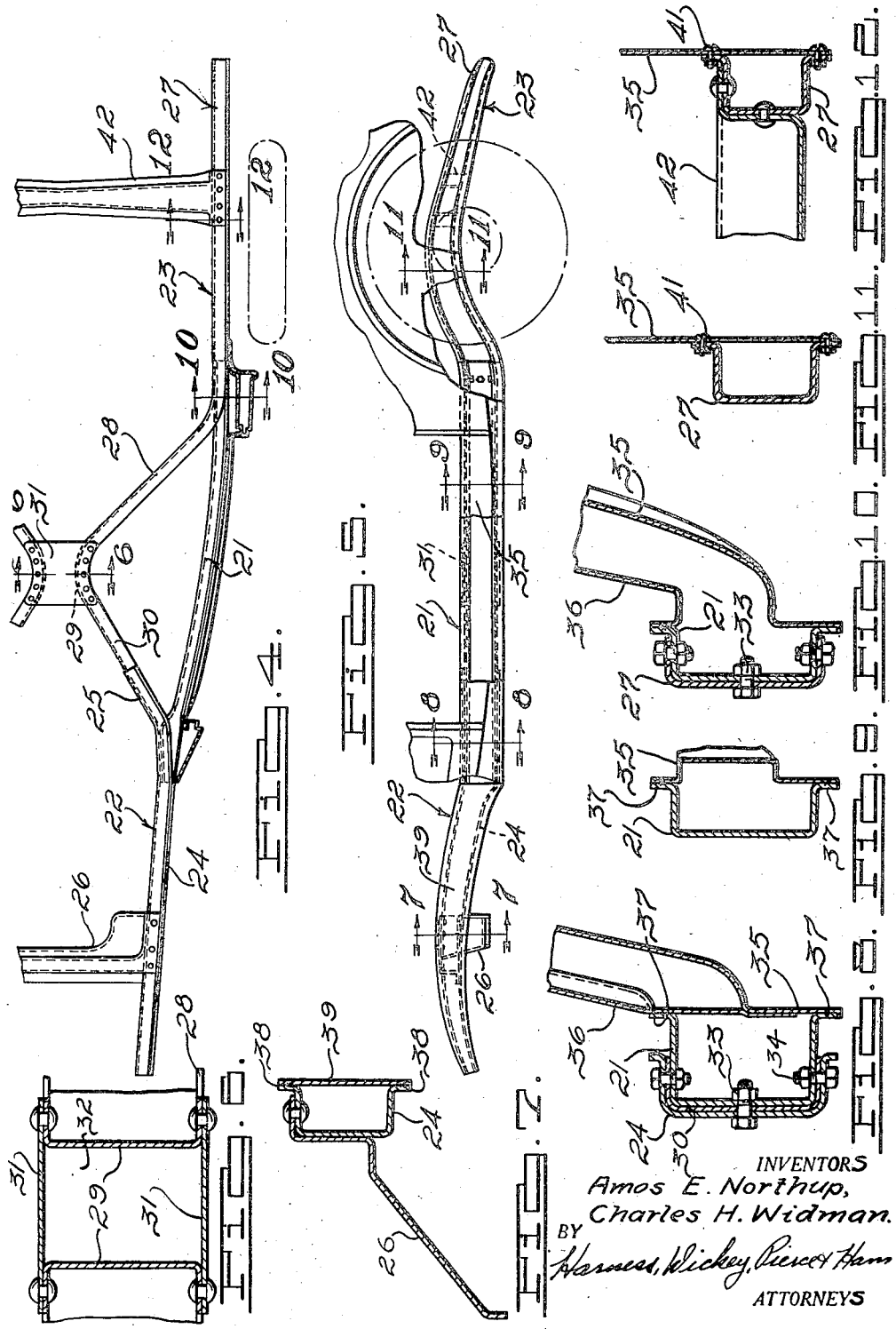

Patented Feb. 23, 1937

2,072,044

UNITED STATES PATENT OFFICE 2,072,044

VEHICLE BODY CONSTRUCTION

Charles H. Widman, Detroit, and Amos E. Northup, Pleasant Ridge, Mich.

Application July 10, 1933, Serial No. 679,612

7 Claims. (Cl. 280—106)

Our invention relates to vehicle bodies and particularly to a vehicle body having a separable chassis frame by which the front engine portion may be separated from the rear chassis section containing the body, from which section the body is also removable.

In our co-pending application Serial No. 673,932, filed June 2, 1933, and assigned to the assignee of the present invention, we have illustrated, described and claimed a chassis frame of the X-member type which is separable at the front terminal end of the body to reduce the overall dimensions for shipping purposes and to permit the power plant portion of the automobile, frontwardly of the body, to be removed for the purpose of repair or for the sustitution of a new unit therefor.

Our present invention follows somewhat the construction in our above mentioned co-pending application with the exception that the rear chassis portion is constructed to embody the X-framing member and a third set of elements which are a portion of the body in the nature of sills, and which are removably associated with the front and rear chassis portions to form the complete chassis frame. In this construction not only is the engine portion removable from the body and rear chassis section but the body itself is removable. This follows more closely the present construction in that the body and sills are made separate from the chassis frame, although in the present day construction the chassis frame is a complete unit in itself upon which the sill is secured. In the present construction the sill portion of the body is a portion of the chassis frame completing the longitudinally extending members thereof to make a complete element. The body may be constructed independently of the chassis frame, as in the present day construction, in a plant separate from the automobile manufacturing plant and when received at the plant may be readily assembled upon the chassis frame to complete the frame construction and, like the structure in the aforementioned application, the sills are eliminated as separate elements distinct from the chassis frame.

Accordingly, the main objects of our invention are to provide a three section chassis frame, a front section which is removable from a rear section, a rear section having X-bracing members and a third section which spans the longitudinally extending portions of the first and second sections to form complete longitudinally extending elements for the chassis frame; to provide a portion of a chassis frame as unit elements of a body which are readily assembled and detached from the chassis frame to have the body removable; to provide a chassis frame from which the engine, springs, wheels, axles and front portion of the body are readily removable and from which the body is also removable, the removable elements containing portions of the chassis frame; and, in general, to construct an automobile having separable units which reduces the overall dimensions for shipping purposes, one wherein the engine and body portion are readily removable and which is simple in construction, economical of manufacture and extremely rigid.

Figure 2:
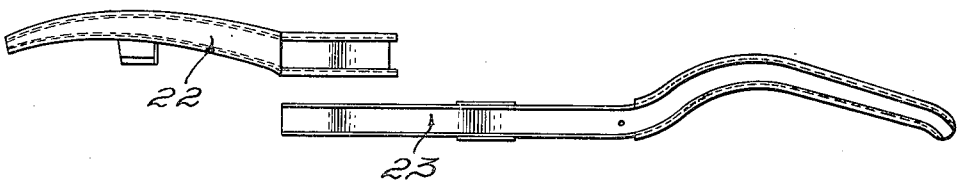
Figure 3:
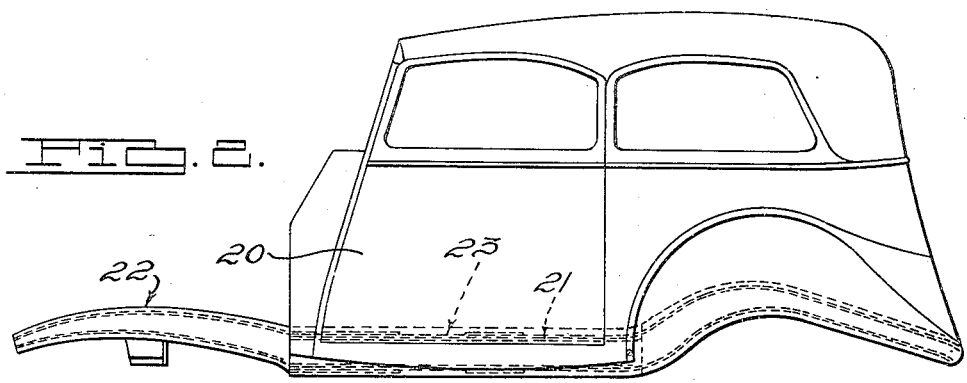

Other objects and features of novelty of our invention will be either specifically pointed out or will become apparent when referring, for a better understanding of our invention, to the following description taken in conjunction with the accompanying drawings, wherein:

Figure 1 is an exploded view of an automobile body and chassis elements embodying features of our invention, Fig. 2 is a view of the structure illustrated in Fig. 1 in assembled relation, Fig. 3 is a complete automobile body which follows the constructions illustrated in Figs. 1 and 2, Fig. 4 is a broken plan view, partly in section, of a chassis frame embodying features of our invention, Fig. 5 is a view in elevation of the structure illustrated in Fig. 4, Fig. 6 is an enlarged sectional view of the structure illustrated in Fig. 4, taken on the line 6—6 thereof, Fig. 7 is an enlarged sectional view of the structure illustrated in Fig. 5, taken on the line 7—7 thereof, Fig. 8 is an enlarged sectional view of the structure illustrated in Fig. 5, taken on the line 8—8 thereof, Fig. 9 is an enlarged sectional view of the structure illustrated in Fig. 5, taken on the line 9—9 thereof, Fig. 10 is an enlarged sectional view of the structure illustrated in Fig. 4, taken on the line 10—10 thereof, Fig. 11 is an enlarged sectional view of the structure illustrated in Fig. 5, taken on the line 11—11 thereof, and Fig. 12 is an enlarged sectional view of the structure illustrated in Fig. 4, taken on the line 12—12 thereof.

While the broad principles of construction in the present application follow the inventive concept embodied in the above mentioned co-pending application, the present invention, while not necessarily an improvement over the type of construction disclosed and described therein, illustrates another form which the chassis section may assume to attain the desirable separable chassis structure having in addition the novelty of having the body also removable.

Referring to Fig. 1, we have illustrated a body 20 preferably of all-metal construction, although composite bodies may be employed. The bodies are in the nature of a shell, having sills directly secured thereto which are constructed to mate with a front chassis section 22 and a rear chassis section 23 to form, when assembled together, a complete chassis frame. The front chassis section 22 terminates substantially at the front end of the body and is so formed as to engage the front end of the rear chassis section 23 and the front end of the chassis portion 21 in nested relation in a manner which will be explained more fully hereinafter.

In Fig. 2, the body is shown in assembled relation secured to the front chassis section 22 and rear chassis section 23, with the three chassis sections 21, 22 and 23 preferably releasably secured together. In Fig. 3, we have illustrated the entire automobile body in complete form to illustrate the fact that the appearance of the vehicle is substantially the same as when a unit chassis frame is employed. The body, however, is somewhat lowered, since the sill of the body which rested upon the top of the chassis frame is eliminated, the sill portion 21 of the chassis frame being aligned and made part of the sections 22 and 23.

Referring to Figs. 4 and 5, we have illustrated the chassis sections 22, 23 and the sill portion of the chassis section 21 as being in united relation forming a complete chassis frame. In the drawing we have illustrated only a left hand portion of the chassis frame. It is to be understood that the right hand portion is the same except for being of opposite hand. The front chassis section 22 is the same as that described in our above mentioned co-pending application, embodying the longitudinally extending side members 24 which are inwardly converging at 25, toward the centerline of the vehicle. A cross brace 26 retains the side members 24 in united relation and constitutes the front portion of the engine mounting.

The rear chassis section 23 is composed of outwardly presenting channel sections 27, the rear portion of which are longitudinally extending, and are deflected inwardly at 28 and reversely bent at 29 and extended at 30 to form the X framing. Gusset plates 31, more clearly illustrated in Fig. 6, are riveted, welded, bolted or otherwise secured to the reversely bent portions 29 to form the complete X framing having a central aperture 32 formed by the spacing of the element 27 and the spacing of the gusset plates 31.

The sill section 21 of the chassis frame is likewise formed of an outwardly presenting channel section being securable to the longitudinally extending portions of the elements 24 and 27 to form a complete longitudinal member for the chassis framing. The sill section 21 constitutes a permanent part of the automobile body and is removable from the framing. In Fig. 7, we have illustrated a section of the cross brace 26 which engages the side members 24 and is riveted or otherwise secured thereto and which is employed as the front support for the engine.

In Fig. 8, we have illustrated the nested relation of the chassis elements wherein the sill portions 21 are slid into engagement with the members 24, being joined thereto at the front end of the longitudinally extending portion thereof and being also mated with the front end of the element 30. The channel sections, being outwardly presenting, nest in relation to each other, as clearly illustrated in Fig. 8. The longitudinally extending elements 24 of the chassis section 22 are in nested relation with the portions 30, all of which are bolted together in a releasable manner. This may be accomplished by having nuts 33 welded directly to the inner surface of the channel elements 21 and have apertures aligned therewith in the elements 24 and 30 through which bolts 34 may extend and be screwed into the nuts.

This type of construction is necessary in view of the unit construction of the body with the sill, the outer paneling 35 and the inner paneling 36 being welded thereto at the outward flanged portions 37 of the sill section 21 of the framing. The welding on flanges of this type is readily accomplished and is a much more simple operation than lap welds as have been employed heretofore.

The longitudinally extending elements 24 of the chassis section 22 are likewise provided with outwardly projecting flanges 38 with which the panel element 39 is welded to form a box section structure, as illustrated in Fig. 7. The welding at the door opening between the paneling and the sill element 21 is clearly disclosed in Fig. 9 and, as pointed out hereinabove, the flange welds are much more simple to effect than lap welds as have been employed heretofore and at the same time a complete box section structure is provided throughout the length of the various chassis sections which has added strength.

In Fig. 10, we have illustrated the joinder between the sill section 21 and the rear section 23 being effected through the nesting relation of the elements 21 and 27, the body paneling being welded to the sill section 21 at the flanges 37 thereof. Nuts 33 may likewise be welded to the inner surface of the sill elements 21 of the framing as described in relation to the structure illustrated in Fig. 8. Rearwardly of this section the paneling 35 is secured to the longitudinally extending portion 27 of the chassis section 23 by releasable means, preferably by bolts 41, to have the body removable from the rear chassis section 23.

In Fig. 12 we have illustrated a section through the rear brace 42 provided on the chassis section 23 for the purpose of spacing and bracing the rear portion of the section. The brace 42 has its ends flanged to mate with the outer surface of the channel elements 27 and to be riveted or otherwise secured thereto.

It is to be understood that, while we have illustrated the various sections as being removably secured together, after shipment and final assembly the elements may be welded, riveted or otherwise permanently fixed when the further use of the demountable construction is no longer required. However, in the preferred form the structure is releasably secured together so that the engine portion may be removed and be repaired or a new unit substituted therefor and in the same manner the body may be quickly removed and a new body substituted or repairs made on the body separate from any repairs that may be made on the chassis framing.

While we have described and illustrated but a single embodiment of our invention, it will be apparent to those skilled in the art that various changes, omissions, additions and substitutions may be made therein without departing from the spirit and scope of our invention, as set forth in the accompanying claims.

We claim as our invention:

1. In a motor vehicle, a chassis frame having separable front and rear sections, embodying X framing, and a body having sill elements secured thereto which span the sides of the X-frame and unite with said front and rear sections to form a complete chassis frame.

2. In a motor vehicle, a chassis frame of separable front and rear sections which, when united, constitute longitudinal end portions and a central X portion, and side elements attachable to the longitudinal end portions to form a complete chassis frame having longitudinally extending members and an X frame.

3. A motor vehicle body and chassis assembly including, in combination, sills for said body of outwardly presented channel shape to which the body paneling is secured to form box section structure, a rear chassis section, and a front chassis section uniteable with the sills of said body to form a complete chassis frame for the vehicle.

4. A motor vehicle body and chassis assembly including, in combination, a rear chassis section formed to constitute an X member, a front chassis frame mateable therewith, a body, and sill elements on said body mateable with the front and rear chassis elements to span the sides of the X-frame and complete the chassis frame assembly and form the support for the body.

5. A chassis frame for a motor vehicle including, in combination, a front section of outwardly presented channel section, a rear section of outwardly presented channel section, and a sill section likewise of outwardly presented channel section all of which are uniteable in nested relation to be releasably retained to form a complete chassis frame.

6. A motor vehicle having a body mounted on a section of a chassis frame and which is secured to the frame in such manner as to form a box section construction therewith, a front section of a chassis frame of outwardly presenting channel elements which are likewise covered by paneling to form box section structure and a third section disposed rearwardly of said first section which is likewise constructed from outwardly presented channel elements covered by paneling to form a box section, said three sections being uniteable together to form a unit chassis frame.

7. A sectional chassis frame including, in combination, a front unit having longitudinally extending side elements which converge toward each other near their rear end, a rear unit which is provided with longitudinally extending elements at the rear end and which converge and diverge from each other forming an X-member at the front part of the unit and side elements spanning the longitudinally extending portions of the front and rear units to form complete longitudinal side elements for the framing which constitutes the complete chassis structure.

AMOS E. NORTHUP.
CHARLES H. WIDMAN.